US008352924B2

United States Patent
Wu et al.

(10) Patent No.: US 8,352,924 B2
(45) Date of Patent: Jan. 8, 2013

(54) METHOD AND DEVICE FOR MULTI-CORE INSTRUCTION-SET SIMULATION

(75) Inventors: Meng-Huan Wu, Hsinchu (TW); Cheng-Yang Fu, Hsinchu (TW); Peng-Chih Wang, Xiluo Town (TW); Ren-Song Tsay, Jhubei (TW)

(73) Assignee: National Tsing Hua University, Hsin Chu (TW)

( * ) Notice: Subject to any disclaimer, the term of this patent is extended or adjusted under 35 U.S.C. 154(b) by 747 days.

(21) Appl. No.: 12/588,324

(22) Filed: Oct. 13, 2009

(65) Prior Publication Data
US 2010/0269103 A1   Oct. 21, 2010

(30) Foreign Application Priority Data
Apr. 21, 2009   (TW) ............................... 98113244 A (51) Int. Cl.
*G06F 9/45* (2006.01)
(52) U.S. Cl. .......................... 717/135; 717/149; 703/22
(58) Field of Classification Search ................... 717/135
See application file for complete search history.

(56) References Cited

U.S. PATENT DOCUMENTS

| | | | | |
|---|---|---|---|---|
| 5,615,357 | A * | 3/1997 | Ball | 703/21 |
| 6,230,114 | B1 * | 5/2001 | Hellestrand et al. | 703/13 |
| 6,584,436 | B2 * | 6/2003 | Hellestrand et al. | 703/13 |
| 7,493,606 | B2 * | 2/2009 | Morin | 717/149 |
| 7,779,393 | B1 * | 8/2010 | Manovit et al. | 717/132 |
| 7,873,506 | B2 * | 1/2011 | Hintikka et al. | 703/19 |
| 8,006,204 | B2 * | 8/2011 | Killian et al. | 716/100 |
| 2002/0032559 | A1 * | 3/2002 | Hellestrand et al. | 703/22 |
| 2002/0152061 | A1 * | 10/2002 | Shimogori et al. | 703/21 |
| 2003/0074177 | A1 * | 4/2003 | Bowen | 703/22 |
| 2003/0105620 | A1 * | 6/2003 | Bowen | 703/22 |
| 2005/0204316 | A1 * | 9/2005 | Nebel et al. | 716/2 |

OTHER PUBLICATIONS

J. Jung, S. Yoo, and K. Choi, "Performance improvement of multiprocessor systems cosimulation based on SW analysis", Date Conference and Exhibition, pp. 749-753, Mar. 2001.*
Oliver Wahlen, Manuel Hohenauer, Rainer Leupers, and Heinrich Meyr. 2003. Instruction Scheduler Generation for Retargetable Compilation. IEEE Des. Test 20, 1 (Jan. 2003), 34-41.*
Hector Posadas, Eugenio Villar, and Francisco Blasco. Real-time operating system modeling in SystemC for HW/SW co-simulation. In XX Conference on Design of Circuits and Integrated Systems, DCIS'05, IST Lisboa, 2005.*
Youngmin Yi; Dohyung Kim; Soonhoi Ha; , "Fast and Accurate Cosimulation of MPSoC Using Trace-Driven Virtual Synchronization," Computer-Aided Design of Integrated Circuits and Systems, IEEE Transactions on , vol. 26, No. 12, pp. 2186-2200, Dec. 2007.*

(Continued)

*Primary Examiner* — Wei Zhen
*Assistant Examiner* — Matthew Brophy
(74) *Attorney, Agent, or Firm* — Bacon & Thomas, PLLC (57) ABSTRACT

The present invention discloses a method for multi-core instruction-set simulation. The proposed method identifies the shared data segment and the dependency relationship between the different cores and thus effectively reduces the number of sync points and lowers the synchronization overhead, allowing multi-core instruction-set simulation to be performed more rapidly while ensuring that the simulation results are accurate. In addition, the present invention also discloses a device for multi-core instruction-set simulation.

13 Claims, 10 Drawing Sheets

OTHER PUBLICATIONS

Dohyung Kim, Soonhoi Ha, and Rajesh Gupta. 2006. Parallel co-simulation using virtual synchronization with redundant host execution. In Proceedings of the conference on Design, automation and test in Europe: Proceedings (Date '06). European Design and Automation Association, 3001 Leuven, Belgium, Belgium, 1151-1156.*

Bob Cmelik and David Keppel. 1994. Shade: a fast instruction-set simulator for execution profiling. SIGMETRICS Perform. Eval. Rev. 22, 1 (May 1994), 128-137. DOI=10.1145/183019.183032.*

Jianwei Chen, Murali Annavaram, and Michel Dubois. 2009. SlackSim: a platform for parallel simulations of CMPs on CMPs. SIGARCH Comput. Archit. News 37, 2 (Jul. 2009), 20-29. DOI=10.1145/1577129.1577134 http://doi.acm.org/10.1145/1577129.1577134.*

Schnerr, J.; Bringmann, O.; Rosenstiel, W.; , "Cycle accurate binary translation for simulation acceleration in rapid prototyping of SoCs," Design, Automation and Test in Europe, 2005. Proceedings , vol., no., pp. 792-797 vol. 2, Mar. 7-11, 2005.*

Nianle Su; Hongtao Hou; Feng Yang; Qun Li; Weiping Wang; , "Optimistic Parallel Discrete Event Simulation Based on Multi-core Platform and its Performance Analysis," Complex, Intelligent and Software Intensive Systems, 2009. CISIS '09. International Conference on , vol., no., pp. 675-680, Mar. 16-19, 2009.*

Carsten Gremzow. 2007. Compiled low-level virtual instruction set simulation and profiling for code partitioning and ASIP-synthesis in hardware/software co-design. In Proceedings of the 2007 summer computer simulation conference (SCSC). Society for Computer Simulation International, San Diego, CA, USA, 741-748.*

E. Witchel and M. Rosenblum, "Embra: fast and flexible machine simulation," in SIGMETRICS '96: Proceedings of the 1996 ACM SIGMETRICS international conference on Measurement and modeling of computer systems. pp. 68-79, 1996.*

* cited by examiner

FIG.10

METHOD AND DEVICE FOR MULTI-CORE INSTRUCTION-SET SIMULATION

FIELD OF THE INVENTION

The present invention is generally related to a method for instruction-set simulation. More particularly, the present invention is directed to a method for performing multi-core instruction-set simulation in shared memory multi-core systems.

BACKGROUND OF THE INVENTION

With the development of technology, instruction-set simulator (ISS) is an indispensable tool for system level design. A hardware designer is able to perform the exploration and/or verification by an instruction-set simulator before the realization of the design. As a result, it is able to decrease the non-recurring engineering cost (NRE cost) in product development. A software designer can test a program on an instruction-set simulator instead of running it on real target machines, and hence the turnaround time can be reduced.

After several years of development, the performance of the traditional instruction-set simulator integrated into a single core machine is nearly optimum (fast and accurate). However, as the evolution of semiconductor manufacturing processes, two or more processors can be encapsulated in a single chip. Traditional single-core systems have been gradually substituted by multi-core systems. In order to maximize multi-core efficiency, more and more applications or programs are developed by using parallel programming model; however, the instruction-set simulator of a traditional single core system cannot manage the different cores synchronously so that simulations by different cores are not executed efficiently.

In a multi-core system, a plurality of programs is simultaneously and synchronously performed. So far, multi-core instruction-set simulation (MCISS) is designed for the programs on multi-core systems. Generally, multi-core instruction-set simulation can be established by a plurality of instruction-set simulators; however, it might result in that the instruction-set simulators randomly being arranged to the idle host core.

Figure 1A:
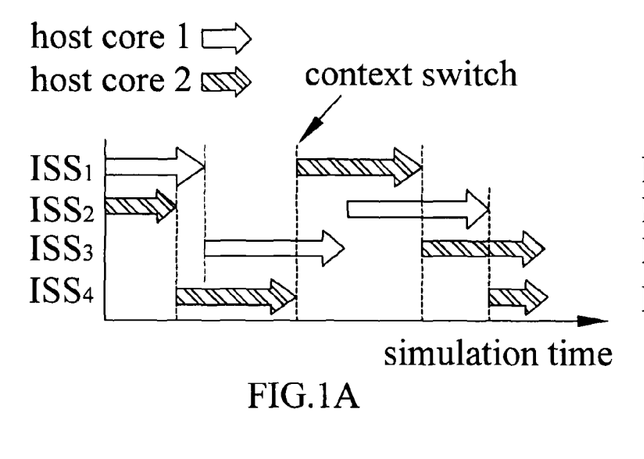
FIG. 1A illustrates simulated time for simulating four ISS on a two-core host.
Figure 1B:
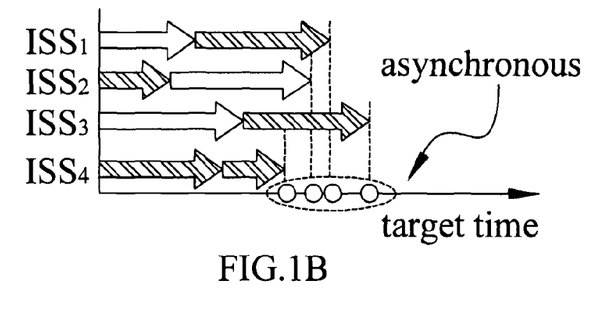
FIG. 1B illustrates asynchronous target time of the four simulated programs shown in FIG. 1A.
Figure 1C:
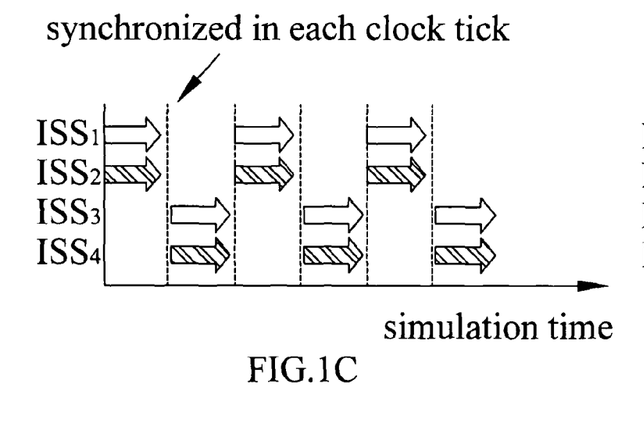
FIG. 1C illustrates simulated time for synchronizing the four ISS by lock-step approach on a two-core host.
Figure 1D:
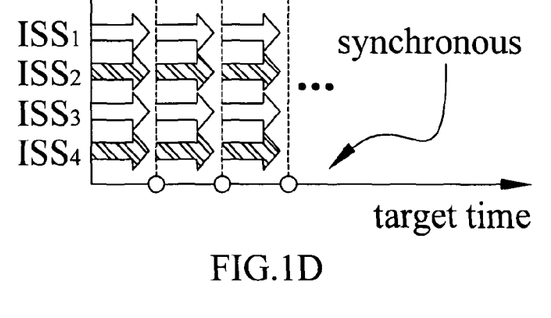
FIG. 1D illustrates synchronous target time of the four simulated programs shown in FIG. 1C.

Refer to FIG. 1A and FIG. 1B respectively showing that the simulation time and the asynchronous target time for performing a four-core instruction-set simulator by host core 1 and host core 2. Simulation time means that the time for performing the instruction-set simulators by a host core, and target time means that the actual time for the simulated programs performed in the target. In this example, four instruction-set simulators are performed by two host cores so that each instruction-set simulator is switched to execute between two host cores and this is named context switch. If the above simulation programs start at the same time, as shown in FIG. 1B, the target time of each of the target cores is asynchronous. It may result in that the correct interaction between target programs cannot be simulated, and the problems such as race condition or deadlock cannot be revealed. Using traditional lock-step approach enables the instruction-set simulators to be synchronized in each clock tick (as shown in FIG. 1C) for the purpose of solving the above problem. As shown in FIG. 1D, it enables the target times of all simulation programs to be synchronized. The time points needing to be synchronized are named "sync point", and each clock tick starts is a sync point. The instruction-set simulators need to stop at each sync point for the purpose of performing synchronization. Therefore, lock-step approach incurs overhead in synchronization.

Current multi-core instruction-set simulators involve a tradeoff between simulation speed and accuracy. Consequently, how to rapidly and accurately perform multi-core instruction-set simulation is a crucial role for efficient development. The present invention is directed to a method for multi-core instruction-set simulation, and it enables to perform an instruction-set simulation more rapidly and accurately by means of identifying the correlation among the processors.

SUMMARY OF THE INVENTION

In these regards, the present invention is directed to a method for performing multi-core instruction-set simulation. The method for multi-core instruction-set simulation disclosed by the present invention comprises performing a plurality of steps in compile time and performing a plurality of steps in run time. The steps executed in compile time comprise: converting a binary program of a target frame into intermediate code; analyzing a control flow instruction of the said intermediate code to establish a control flow graph (CFG) of said binary program; estimating the execution time of each basic block in said control flow graph; estimating the relative time of each read or write memory instruction; finding out a read or write memory instruction which is the earliest possible instruction to be met after finishing the execution of a basic block; pre-determining each read or write memory instruction as a sync point, wherein if a register used to point to the addresses of read or write memory instructions is a stack pointer register or a frame pointer register, the sync point of each read or write memory instructions is removable; inserting corresponding sync handlers respectively according to whether each sync point is a read memory instruction or a write memory instruction; and using the intermediate code, the read or write memory instruction which is the earliest possible instruction to be met after finishing the execution of basic block, the sync point and the sync handler to generate native codes corresponding to simulated binary program. The steps executed in run time comprise: executing said native code in the simulation process, wherein a instruction-set simulator stops and executes a sync handler while the instruction-set simulator reaches to a sync point; checking the address of the read or write memory by the instruction-set simulator in the sync handler, wherein if it is not within the scope of a shared memory segment, the instruction-set simulator will stop the sync handler and subsequently resume the simulation process, and if it is within the scope of a shared memory segment, the instruction-set simulator will synchronize with others; and the instruction-set simulator subsequently resumes the simulation process after synchronizing the instruction-set simulator with others.

A device for multi-core instruction-set simulation disclosed by the present invention comprises: a static module and a dynamic module. Said static module comprises: a first transcoding module used to convert a binary program of a target frame into an intermediate code; a control flow graph module coupled to said first transcoding module, for analyzing a control flow instruction for establishing a control flow graph of the binary program; a timing estimation module coupled to said control flow graph module, for estimating execution time of each basic blocks in the control flow graph, estimating relative time of each read or write memory instructions, and finding out a read or write memory instruction which is the earliest possible instruction to be met after finishing the execution of basic block; a sync point module coupled to said first transcoding module for setting each read or write memory instruction to be a sync point, wherein if the register used to point to the addresses of read or write memory instructions is a stack pointer register or a frame pointer register, sync points of given instructions are removable; a sync handler module coupled to the first transcoding module, the control flow graph module, the timing estimation module, and the sync point module, for inserting corresponding sync handlers respectively according to each sync point; and a second transcoding module coupled to the sync handler module generating native codes according to the intermediate code, the read or write memory instruction which is the earliest possible instruction to be met after finishing the execution of basic block, the sync point, and the sync handler. Said dynamic module comprises: a simulation module coupled to the second transcoding module in the static module for performing a simulation process by executing the native codes, wherein when an instruction-set simulator reaches to a sync point, the instruction-set simulator stops and executes a sync handler; a decision module coupled to the simulation module for checking the accessed address of the instruction-set simulator which has entered the sync handler, wherein if it is not within the scope of a shared memory segment, the instruction-set simulator will stop the sync handler and subsequently perform the simulation; and a synchronization module coupled to the decision module and the simulation module wherein if the decision module decides the address of the read or write memory instruction of the instruction-set simulator is within the scope of a shared memory segment, the instruction-set simulator synchronizes with other instruction-set simulators and subsequently resumes the simulation process after completing the synchronization.

One advantage of the present invention allows that the multi-core instruction-set simulation provides the function of synchronization and maintains the accuracy.

The other advantage of the present invention is keeping the speed in a good level and efficiently decreasing the synchronization overhead.

To further understand technical contents, methods and efficacy of the present invention, please refer to the following detailed description and drawings related the present invention.

BRIEF DESCRIPTION OF THE FIGURES

The invention is more fully appreciated in connection with the following detailed description taken in conjunction with the accompanying drawings; however, those skilled in the art will appreciate that these examples are not intended to limit the scope of the present invention, and various changes and modifications are possible within the sprit and scope of the present invention.

DETAILED DESCRIPTION OF THE INVENTION

In the description below, for the purposes of explanation, numerous specific details are set forth in order to provide a thorough understanding of the present invention. It will be apparent, however, to one skilled in the art that the present invention may be practiced without some of these specific details. Furthermore, the terms described in the preferred embodiment of the present invention shall be interpreted in most extensive and reasonable way.

Furthermore, in order to overcome said drawbacks of prior arts about the synchronization of multi-core instruction-set simulation, the present invention is able to identify the correlation among different processors and synchronize the instruction-set simulator of each core by means of the correlation among different cores for the purpose of achieving a correct simulation result.

In a shared memory model, executive programs for different cores indirectly interact with each other by means of reading/writing accesses of the memories. Hence, in order to ensure a correct simulation result, the accesses of memories shall be performed in order if any two of memory accesses to the same data address are provided with any one of the dependency relationships as follow: (1) write after write (WAW), (2) write after read (WAR), and (3) read after write (RAW). The term "synchronization" described in the specification means the process for checking or maintaining the above dependency relationship. The corresponding memory access points are named "sync points".

Because the instruction-set simulator executes the programs in sequence, the memory accesses in one program will always be executed in order. Consequently, in the method for synchronization of the present invention, it only needs to identify and maintain the memory accesses among the different programs and execute them in the right order. Theoretically, it only needs to identify whether the memory accesses to the same address are provided with any one of the above dependency relationship; however, in real practice, the memory space is too large to track different addresses. Besides, the indirect addressing mode which is common to use is unable to statically predict the correct access address. If regard each access of the memories as a sync point, a large number of memory accesses result in simulation speed becoming very slow. In order to solve the above problems, the following detailed description discloses how to reduce the numbers of sync points.

In respect of software, only few shared variables are provided with data dependency relationship of memory access. As a result, if the shared variables are the only factors for consideration, it is able to significantly reduce the numbers of sync points.

Figure 2:
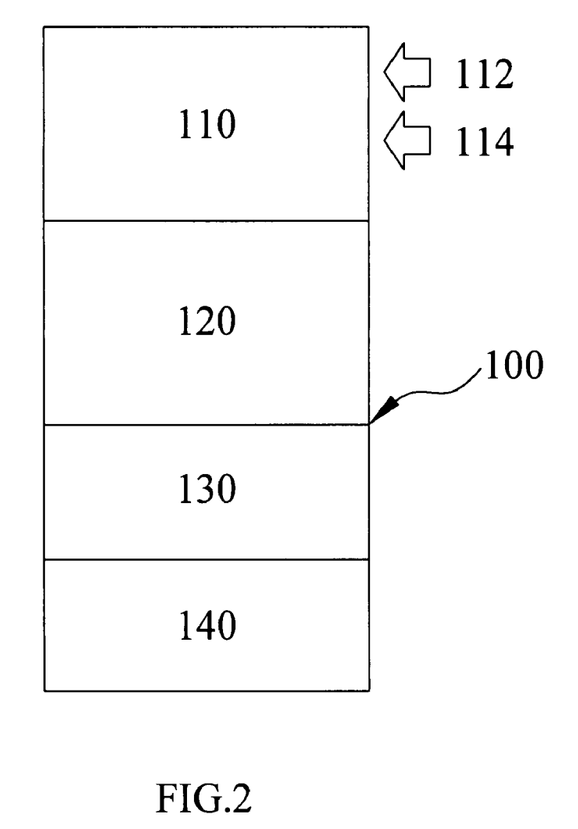
FIG. 2 illustrates a schematic diagram of a traditional memory space of a process (executing program).

FIG. 2 illustrates a traditional memory space of a process (executing program). As illustrated, a memory space 100 of process is divided into several segments, included a stack segment 110, a shared data segment 120, a private data segment 130, and a text segment 140. Generally speaking, in compilation process, compiler only distributes the shared variables in a shared data segment 120. In addition, it can also utilize a special function register to identify the different memory segments. For example, a data frame pointer register 112 and a stack pointer register 114 always point to a stack segment 110, and the stack segment 110 contains the local variables so that it is easy to identify the memory accesses of local variables and exclude them out from the sync points.

In the same way, it is unable to exclude a private data segment 130 and a text segment 140 out from the sync points in advance; however, it can obtain the real address range of a private data segment 130 and a text segment 140 by the target programs at run time so that the address range is able to be exclude from the synchronization. Through the said steps, the number of sync points is significantly reduced and the simulation speed is greatly improved.

In order to ensure the accuracy of simulation result, after reducing the sync points, it shall be confirmed that it is impossible for the sync points to violate any dependency relationships. Suppose that in a simulation time point, when any one simulator $ISS_1$, of many instruction-set simulators within a simulation program $P_1$, reaches a sync point $S_1$, other instruction-set simulators are executing non-sync point instructions or waiting for being waked up. In addition, suppose that any one of remained simulators with a simulation program $P_2$, the next sync point will be $S_2$. In this situation, if we anticipate the earliest target time $t_2$ of $S_2$ being later than the target time $t_1$, of $S_1$, it will not cease violation of dependency relationships. As a result, $ISS_1$, can keep executing the instructions and will not conflict with $ISS_2$. On the contrary, if $t_1$ is later than $t_2$, it may be possible to violate the dependency relationships. When there are potential possibilities of violating the dependency relationships, $ISS_1$, shall wait for $ISS_2$ until reaching sync point $S_2$. At this time, the dependency relationships can be ensured.

Figure 3A:
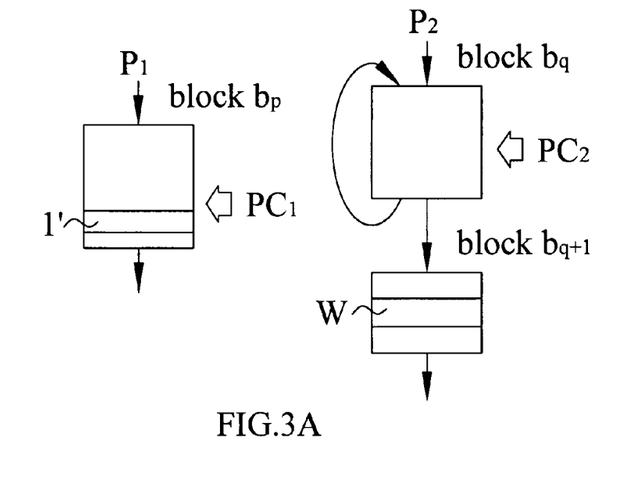
FIG. 3A illustrates a partial control flow graph of an embodiment of programs (P1 and P2).
Figure 3B:
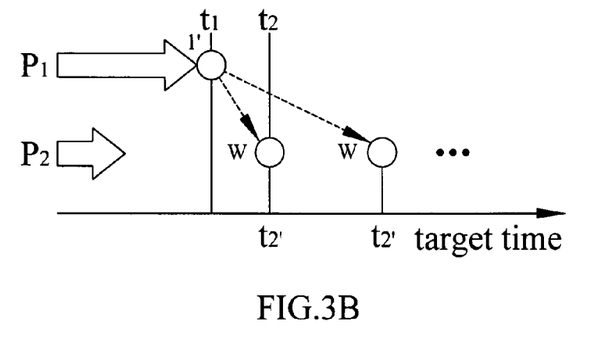
FIG. 3B illustrates a possible dependency relationship when t1<t2 in FIG. 3A.
Figure 3C:
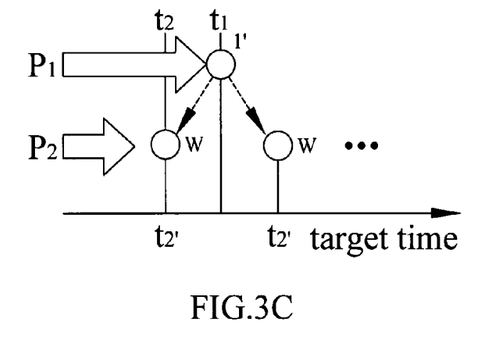
FIG. 3C illustrates a possible dependency relationship when t2<t1 in FIG. 3A.

Refer to FIG. 3A to 3C, they respectively illustrate a partial control flow graph of an embodiment of programs (P1 and P2) and the possible dependency relationships between two programs. In FIG. 3A, an instruction-set simulator enables to execute two simulated program $P_1$ and $P_2$ to the location where the corresponding program counter $PC_1$ and $PC_2$ point to. Suppose that in target time $t_1$, $P_1$ reaches a reading syn point r, and the next sync point of $P_2$ is located in writing access w in next block. Although it is unpredictable which branch line will be adopted, the earliest target time $t_2$ of w which is the earliest possible execution still can be anticipated (while the branch line of block $b_{q+}$, is adopted). Suppose that $t_1 < t_2$, as shown in FIG. 3B, the possible target time $t_2'$ of w will be later than $t_1$. Hence, an instruction-set simulator of $P_1$ is able to keep executing and not to violate the dependency relationships. On the contrary, suppose that $t_1 < t_2$, as shown in FIG. 3C, the possible target time $t_2'$ of w will be earlier or later than $t_1$. If $t_2' > t_1$, $P_1$ is able to keep executing before executing w by $P_2$. On the contrary, if $t_1 > t_2'$, $P_1$ is unable to keep executing before $P_2$ finish executing w. Therefore, in order to prevent from the possibility of violating the dependency relationships, the instruction-set simulator of $P_1$ shall wait until confirming the relationship of $t_1$ and $t_2'$ and then to determine whether to keep executing or not. By performing above steps in each sync point, it is able to ensure the accuracy of the simulation result.

Figure 4:
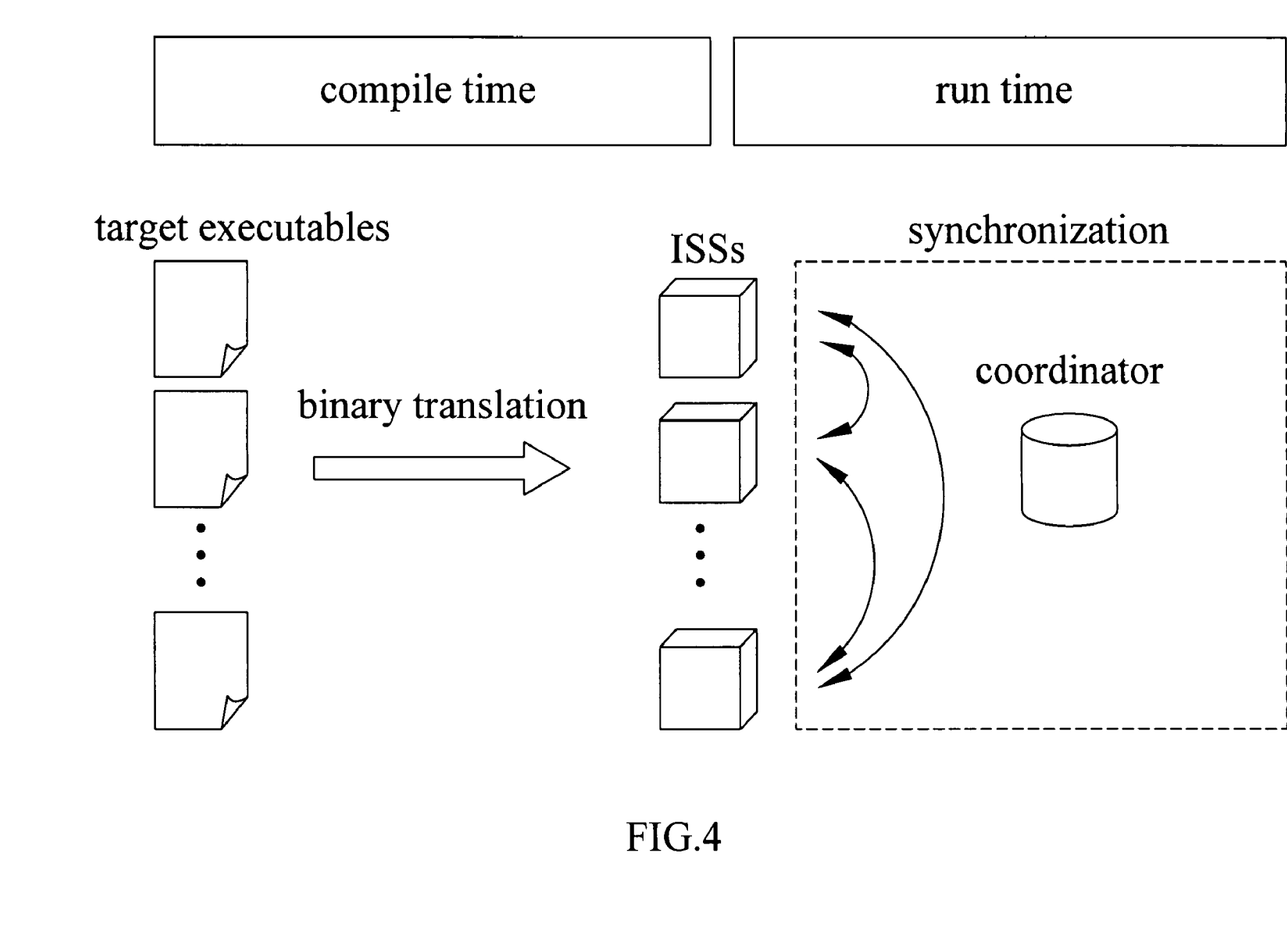
FIG. 4 illustrates a schematic diagram of an embodiment of multi-core simulation.

As a result, the target time of the sync points which can be estimated is able to exclude the possibility of violating the dependency relationships. However, because of the branches within the program, the prediction of the target time must be made at run time. The timing estimation of the binary translation simulation for target time in the present invention is originally described by J. Schnerr, Proc. of the conf. on Design Automation and Test in Europe, pp. 792-797. Those skilled in the art will appreciate that it is able to estimate the execution time of each basic block in a control flow graph by means of the method, to estimate the relative time of each memory access instruction (read/write), and to find out the memory access instruction which is the earliest possible instruction to be met after finishing the execution of basic block Refer to FIG. 4, it illustrates a schematic diagram of an embodiment of the multi-core simulation. As shown in FIG. 4, each core is respectively simulated by an individual instruction-set simulator. In brief, the multi-core simulation methodology disclosed in the present invention includes "static status" and "dynamic status", and wherein "static status" means compile time and "dynamic status" means run time. In compile time, target executables are translated into native code; in run time, an instruction-set simulator will synchronize with other instruction-set simulators through a coordinator and execute the native code to simulate the behavior of programs.

Figure 5:
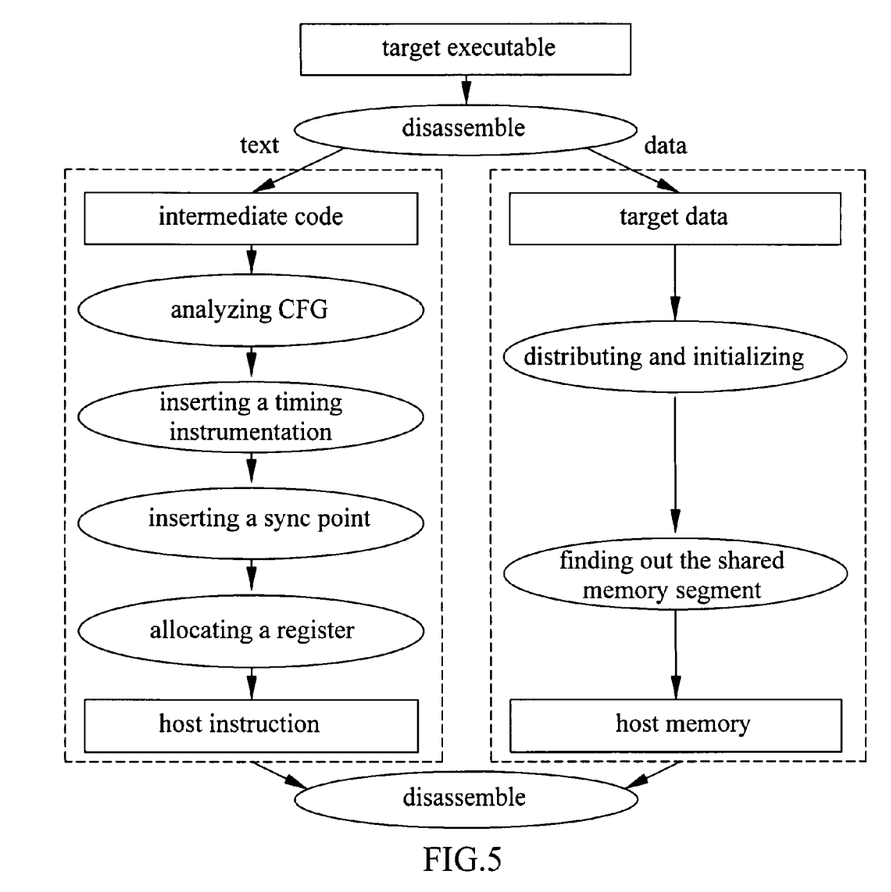
FIG. 5 illustrates a flow diagram of an embodiment of binary translation.

FIG. 5 illustrates a flow diagram of an embodiment of binary translation. As illustrated, a target executable is divided into two main parts: text portion and data portion, and wherein the data portion is distributed and initialized on a host memory. Then the scope of a shared memory segment is found to identify a potential sync point. On the other hand, in light of the text portion, each target instruction is translated to an equivalent host instruction and then is inserted to appropriate synchronization. Said translation comprises: translating a target instruction into an intermediate code and establishing a control flow graph; analyzing the control flow graph and inserting a timing instrumentation into an appropriate point according to the analysis; finding out a sync point in each section of code by means of timing estimation, wherein the sync point is the earliest possible sync point to be met; inserting a synchronization respectively in front of each sync point; allocating a register; and producing a set of corresponding host instructions. After finishing above steps, a simulation can be started.

Figure 6:
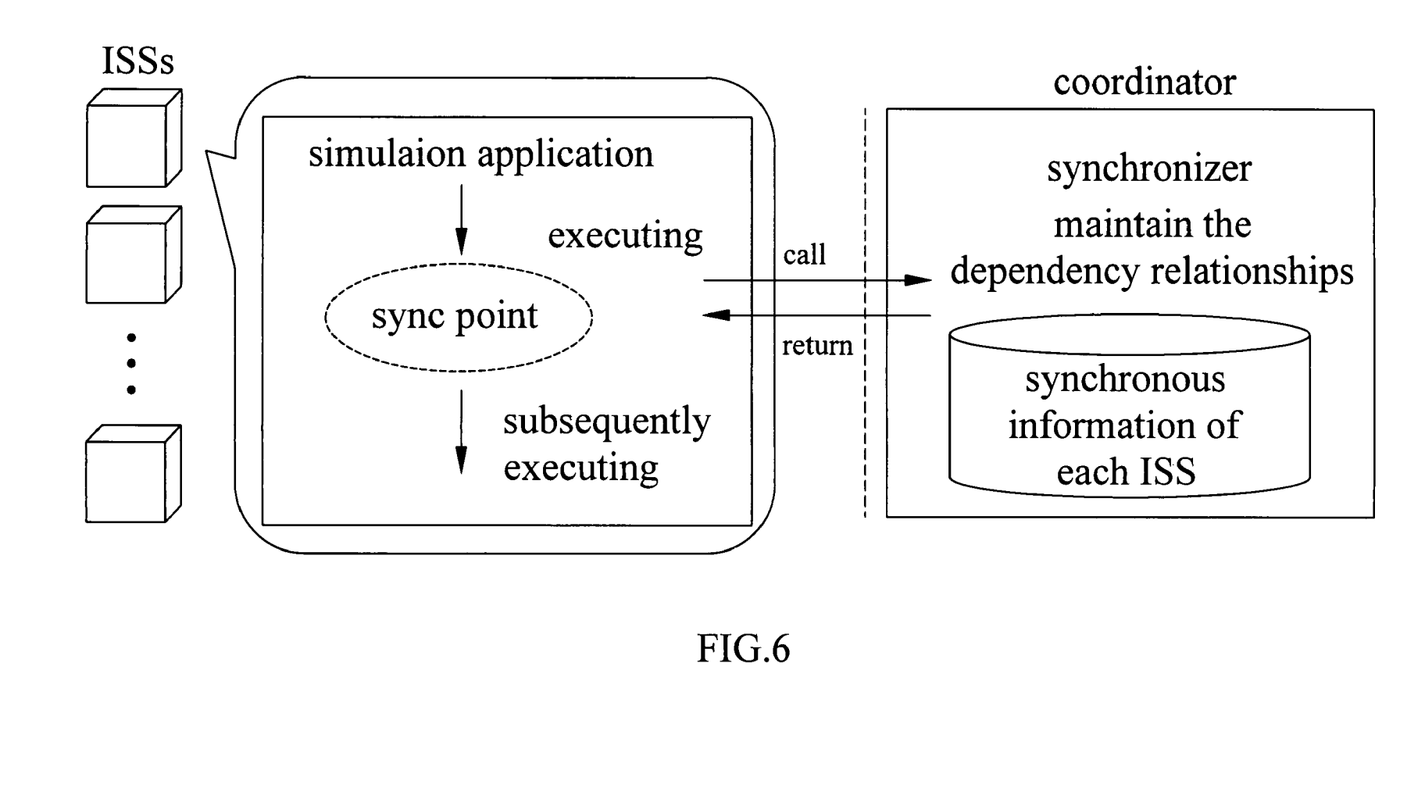
FIG. 6 illustrates a flow diagram of an embodiment of synchronization.

FIG. 6 illustrates a flow diagram of an embodiment of synchronization. As illustrated, a coordinator is utilized to synchronize the instruction-set simulators in simulation at run time. As an exception handling, said coordinator is used as a synchronizer for applying to every sync point. When an instruction-set simulator reaches a sync point, it will call the coordinator and give the control right to the coordinator. Said coordinator possesses the synchronous information of every instruction-set simulator. It uses the synchronous information to check and maintain the dependency relationships for performing the synchronization. After synchronization, said coordinator returns the control right to said calling instruction-set simulator and enables the instruction-set simulator to keep executing. By means of the mechanism, instruction-set simulators can be synchronized. Furthermore, switching between the instruction-set simulator and the coordinator costs only one call instruction time. It does not involve in context switch so that the cost (time) of synchronization can reach its minimum.

Assuming that $t_i^{sim}$ is equal to the time for simulating target instruction i, the equation for estimating the execution efficiency of non-synchronized simulation is as follow:

$$P = \frac{n}{\sum_{i=1}^{n} t_i^{sim}} \quad (1)$$

wherein P means the execution efficiency of non-synchronized simulation, and n means the total number of the simulated instructions.

Besides, assuming that there are m executed sync points, and the waiting time of sync point j is $t_j^{wait}$, then the execution efficiency $P_{sync}$, which has been synchronously simulated can be estimated by use of the following equation:

$$P_{sync} = \frac{n}{\sum_{i=1}^{n} t_i^{sim} + \sum_{j=1}^{m} t_j^{wait}} \quad (2)$$

In the light of equation (2), we can understand that the main factor regarding the time (cost) for synchronization is the number of sync points. In the present invention, the number of sync points is changed with the applications we stimulated. In any case, the number of sync points used in the present invention is much lower than which in lock-step approach. Additionally, the waiting time in a sync point will affect the result of stimulation. When the sync point is reached, the assigned instruction-set simulator should wait for the later one. Hence, the length of the waiting period depends on the distance between the assigned instruction-set simulator and the latest instruction-set simulator. If all the instruction-set simulators are executed in nearly same speed, the maximum speed of simulation can be achieved. By combining the equation (1) and equation (2), we can estimate the synchronization efficiency E of the synchronization performed by different approaches:

$$E = \frac{P_{sync}}{P} = \frac{\sum_{i=1}^{n} t_i^{sim}}{\sum_{i=1}^{n} t_i^{sim} + \sum_{j=1}^{m} t_j^{wait}} \quad (3)$$

Even using the same method of synchronization, the efficiency in different simulators will be different. In light of the same method of synchronization in different simulators, the slower stimulator is more efficient than the faster one. For example, the stimulation speed of an instruction-set simulator of binary translation is faster 50 to 100 times than a simulator based on c language code. Then, in the simulation applying binary translation, the synchronization time is more crucial to simulation efficiency.

Figure 7:
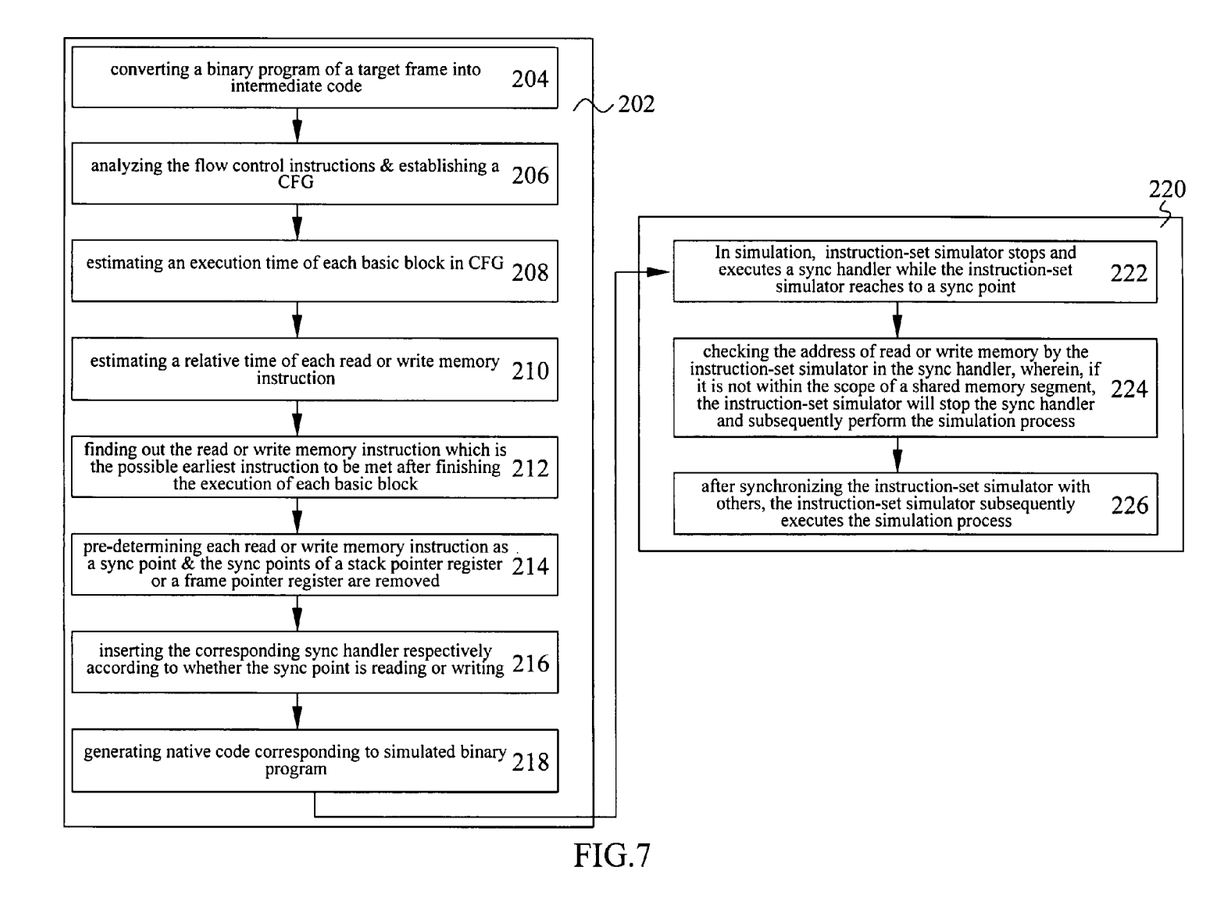
FIG. 7 illustrates a flow diagram of an embodiment of a method for multi-core instruction-set simulation.

FIG. 7 illustrates a flow diagram of an embodiment of a method for multi-core instruction-set simulation. As illustrated, a method for multi-core instruction-set simulation comprises a plurality of steps executed in compile time 202 and a plurality of steps executed in run time 220. The steps executed in compile time 202 comprise: converting a binary program of a target frame into intermediate code, in step 204; analyzing the control flow instructions (including jump, call, and return etc.) of the said intermediate code to establish a control flow graph of said binary program, in step 206; estimating the execution time of each basic block in said control flow graph, in step 208; estimating the relative time (measured from the start of its basic block) of each read or write memory instruction, in step 210; finding out the read or write memory instruction which is the earliest possible instruction to be met after finishing the execution of each basic block, in step 212; pre-determining each read or write memory instruction as a sync point, in step 214, wherein if a register used to point to the address of read or write memory instructions is a stack pointer register or a frame pointer register, the sync point of each read or write memory instructions is removable; inserting the corresponding sync handlers respectively according to whether the sync points are a read or write access, in step 216; and using the intermediate code, the read or write memory instruction which is the earliest possible instruction to be met after finishing the execution of a basic block, the sync point and the sync handler to generate native code 218 corresponding to the simulated binary program. The steps executed in run time 220 comprise: executing said native code in the simulation process as shown in step 222, wherein an instruction-set simulator stops and executes a sync handler while the instruction-set simulator reaches to a sync point; checking the address of read or write memory by the instruction-set simulator in the sync handler as shown in step 224, wherein if it is not within the scope of a shared memory segment, the instruction-set simulator will stop the sync handler and subsequently perform the simulation process; if it is within the scope of a shared memory segment, the instruction-set simulator will execute the synchronization process; after synchronizing the instruction-set simulator with others, the instruction-set simulator subsequently executes the simulation process, as step 226.

It should be noted that said steps about the synchronization of the instruction-set simulator with others comprise identifying steps for the sync point: if the sync point is Read, it should wait until that the next possible write sync points of other instruction-set simulators are later than the target time of the instruction-set simulator for the purpose of maintaining the dependency relationship of "Read After Write" (RAW). If the sync point is "Write", it should wait until that the next possible read and write sync points of other instruction-set simulators are later than the target time of the instruction-set simulator for the purpose of maintaining the dependency relationship of "Write After Write" (WAW) and "Write After Read" (WAR). In addition, step 214 (setting and deleting sync point) can also be executed in step 208 in other embodiments.

Figure 8:
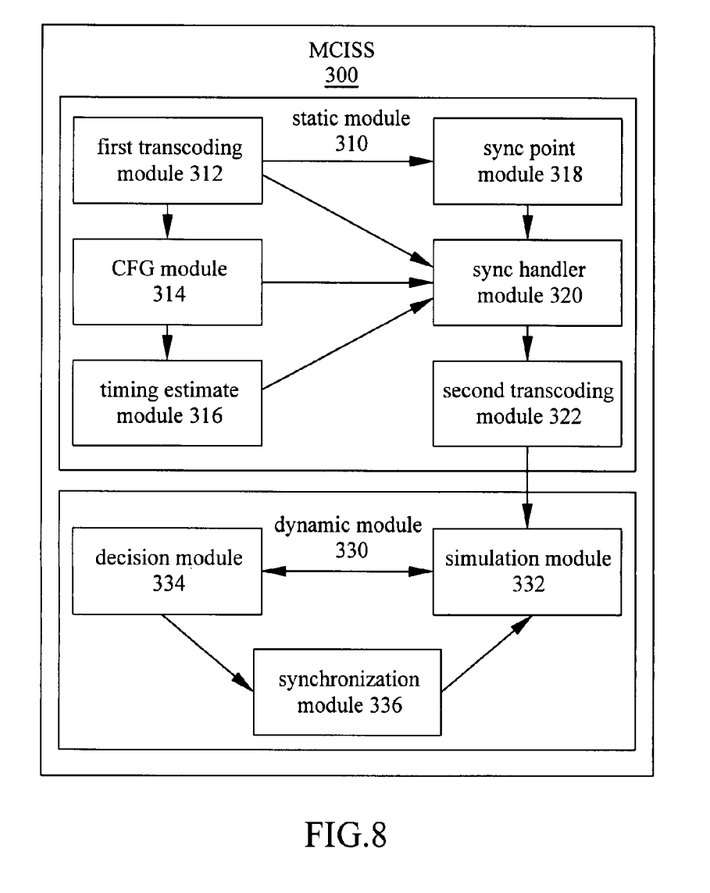
FIG. 8 illustrates a block diagram of an embodiment of a device for instruction-set simulation.

FIG. 8 illustrates a block diagram of an embodiment of a device for multi-core instruction-set simulation. Multi-core instruction-set simulation device 300 comprises a static module 310 and a dynamic module 330. A static module 310 comprises: a first transcoding module 312, a control flow graph (CFG) module 314, a timing estimation module 316, a sync point module 318, a sync handler module 320, and a second transcoding module 332. The first transcoding module 312 is used to convert a binary program of a client frame into an intermediate code. The control flow graph module 314 coupled to the first transcoding module 312 is used to analyze the control flow instructions (such as jump, call, and return) and establish a control flow graph of the binary program. A timing estimation module 316 coupled to said control flow graph module 314 is used to estimate the execution time of each basic block in the control flow graph, estimate the relative time (measured from the start of a basic block) of each read or write memory instruction, and find out the read or write memory instruction which is the earliest possible instruction to be met after finishing the execution of a basic block. The sync point module 318 is coupled to said first transcoding module 312 for setting each read or write memory instruction to be a sync point, wherein if the register used to point to the addresses of read or write memory instructions is a stack pointer register or a frame pointer register, the sync points of given instructions are removable. The sync handler module 320 is coupled to the first transcoding module 312, the control flow graph module 314, the timing estimation module 316, and the sync point module 318 for inserting the corresponding sync handler respectively according to each sync point. The second transcoding module 322 is coupled to the sync handler module 320 for generating native code corresponding to the simulated binary program by the intermediate code and the read or write memory instruction which is the earliest possible instruction to be met after finishing the execution of a basic block. On the one hand, the dynamic module 330 comprises a simulation module 332, a decision module 334, and a synchronization module 336. The simulation module 332 is coupled to the second transcoding module 332 in static module and used to perform a simulation process by executing generated native code, wherein when an instruction-set simulator reaches to a sync point, the instruction-set simulator stops and executes a sync handler. The decision module 334 is coupled to the simulation module 332 for checking the address of read or write memory of the instruction-set simulator which has entered the sync handler, wherein if it is not within the scope of a shared memory segment, the instruction-set simulator will stop the sync handler and subsequently perform the synchronization process. The synchronization module 336 coupled to the decision module 332 and the simulation module 334, wherein if the decision module 334 decides the address of the read or write memory instruction of the instruction-set simulator is within the scope of a shared memory segment, the instruction-set simulator synchronized with other instruction-set simulators and the instruction-set simulator will subsequently execute the simulation process after completing the synchronization.

In a preferred embodiment, said target frame is a multi-core frame with shared memories.

The following experimental results prove that the method for multi-core instruction-set simulation in the present invention can advance the simulation efficiency and significantly shorten the simulation time.

Experimental Results

The testing host used in the experiment is a 4 cores Intel® Xeon® 3.4 GHz and 2 GB ram host machine, and the instruction-set structure is Andes 16/32-bit RISC ISA mixing instruction-set.

Figure 9:
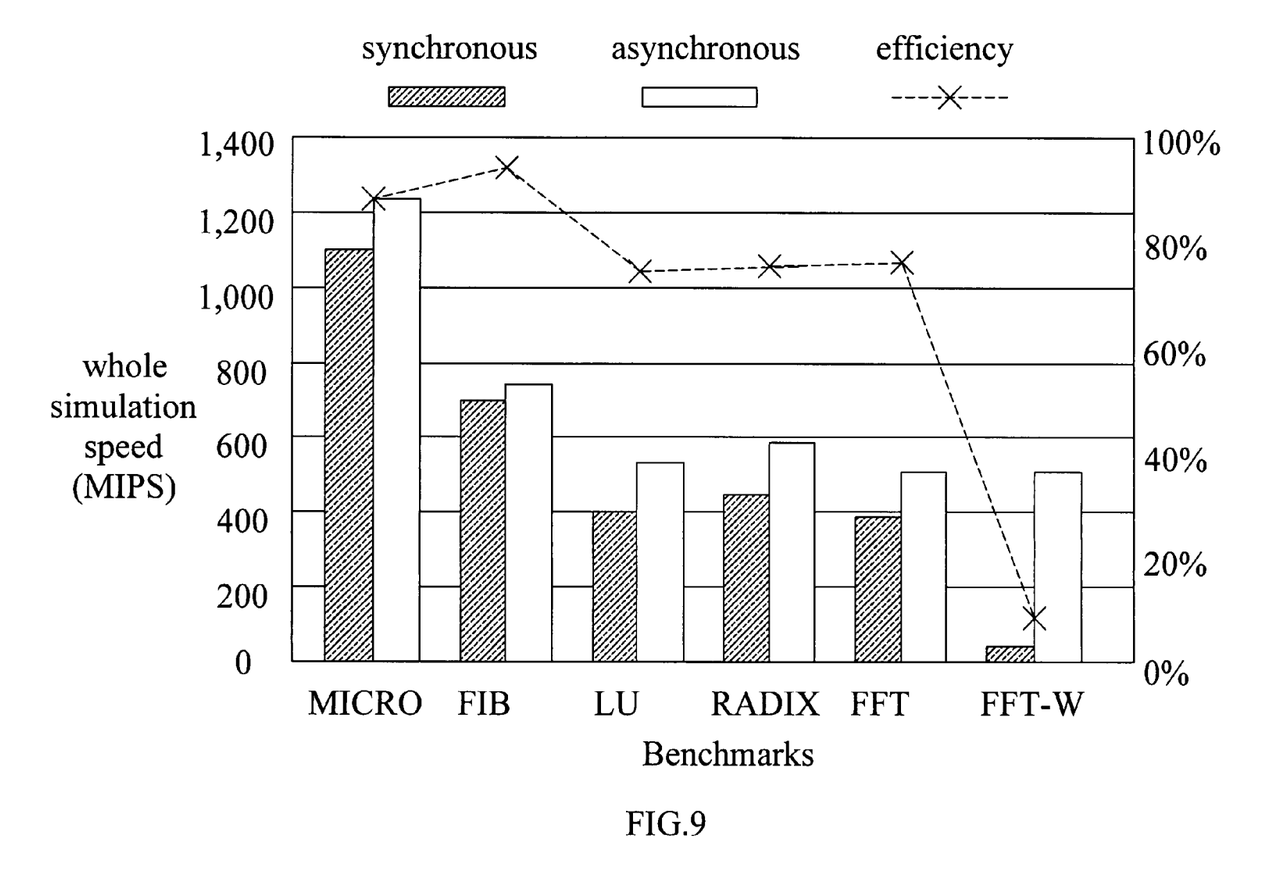
FIG. 9 illustrates simulation results of different benchmarks.

FIG. 9 illustrates simulation results of different benchmarks. The experiment simulates two target cores. Because Micro-benchmark (MICRO) and Fibonacci (FIB) test executives are not provided with accessing of shared memory, using the synchronization method of the present invention or not has no obvious influence in the results of simulation. The efficiency of synchronization is about 90%. Insertion of timing annotation slightly reduces the results of simulation which means that the present invention has small overhead in light of the programs without interactions. LU, RADIX and FFT test executives are a subset of applications from the SPLASH-2 (second release of Stanford Parallel Applications for Shared Memory) suite of parallel applications developed by Stanford University. As illustrated, the efficiency is reduced to 70% because of the overhead produced by the synchronization executed by the shared memory; however, the whole simulation speed is still kept at hundreds of million instructions per second (MIPS). Besides, for estimating the possible worst result obtained by applying the present invention, in FFT-W test, it significantly increases the accessing of the shared memory. There is one shared access per 12 instructions in average. Though, the efficiency is significantly reduced, the whole simulation speed is still kept at 40 MIPS.

Figure 10:
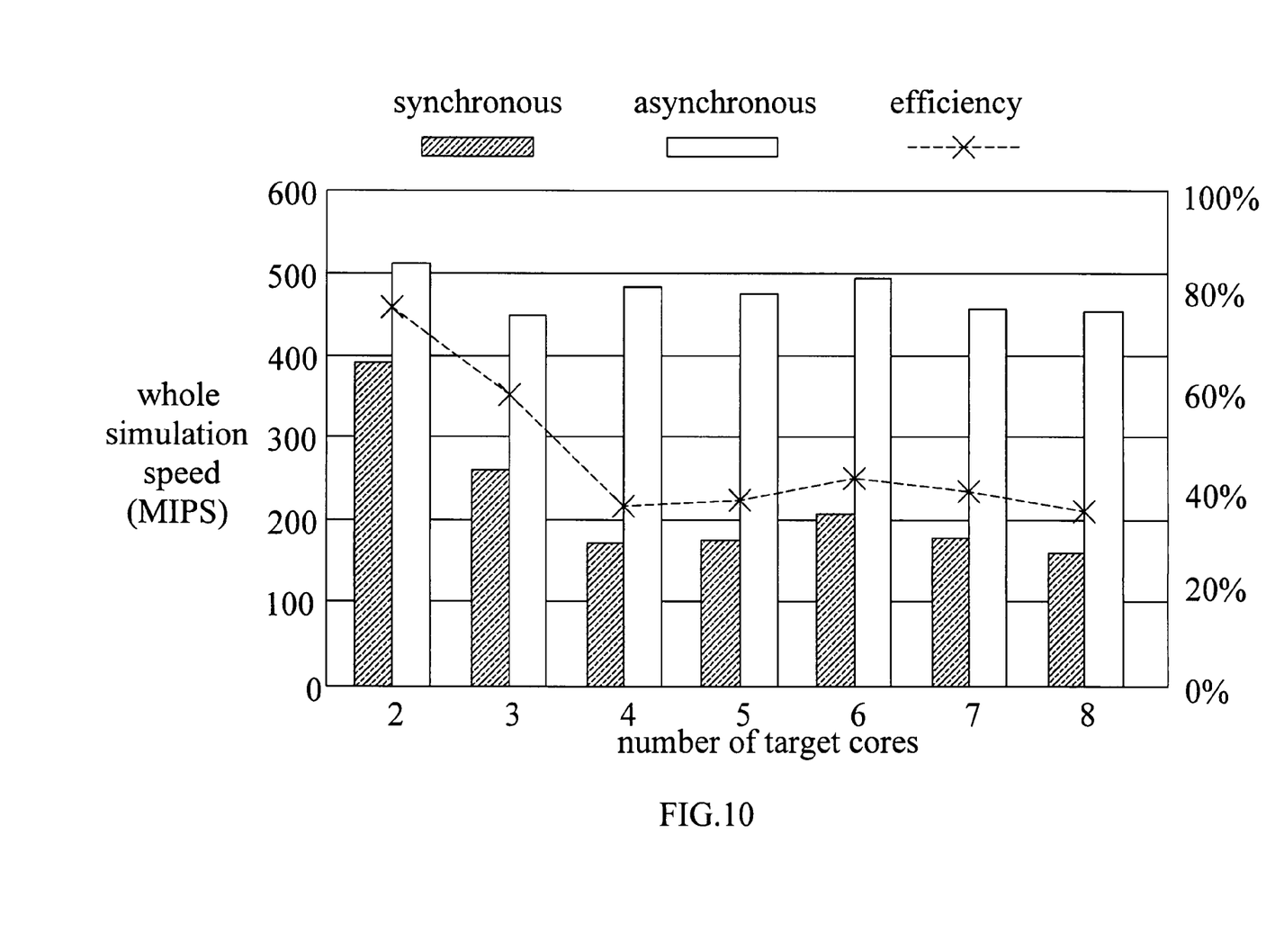
FIG. 10 illustrates a simulation result of FFT Benchmark in different number of target cores.

FIG. 10 illustrates the simulation result of FFT Benchmark in different number of target cores. It should be noted that LU and RADIX parallel applications of other shared memories produce the similar results. As illustrated, the simulation speed will not rise with increasing the number of target core even the synchronization is not performed. The reason is because the simulation is the memory-bound application. Hence, increasing the instruction-set simulators also results in increasing the competition of memory buses and restricts the simulation speed. More simulation cores provide more sync points, and an additional target core means that an additional dependency relationship is necessary to be checked in each sync point. Consequently, it produces more synchronization overheads. In the light of performing synchronization by two-core or four-core instruction-set simulator, the efficiency is decreased with the increasing the number of core. More than four cores, the marginal overheads of each additional core are decreased and the decrease of efficiency is slow. As a whole, the simulation speed can be kept at 150 to 200 MIPS.

Table 1 illustrates the simulation speed by using different methods. In lock-step approach, the huge overhead significantly decreases the simulation speed of multi-core instruction-set designed for binary translation. The simulation speed in lock-step approach is much lower than 1 MIPS. On the contrary, in the method provided by the present invention, the perfect simulation speed is about 1 GIPS and the worst simulation speed is still up to about 40 MIPS. In addition to parallel simulation, table 1 also illustrates the multi-core simulation speed of each simulation program serializing by round robin. It is because that the instruction-set designed for binary translation cannot be serialized, the serialization only can be applied to the instruction-set simulator implemented by C functions. Therefore, although the serialization does not have the synchronization overhead, the simulation speed is limited about 10 to 20 MIPS.

TABLE 1

| The simulation speed by using different methods | | |
| --- | --- | --- |
| The present invention | Lock-Step approach | Serial |
| 40 MIPS~1 GIPS | <1 MIPS | 10~20 MIPS |

In addition, the result obtained by embodiment of the present invention is same as obtained by Lock-Step approach. It is proved that the present invention provides the same accuracy.

To sum up, the method for multi-core instruction-set simulation disclosed by the present invention is able to effectively reduce the synchronization overheads and achieve the accurate simulation at the same time.

The above descriptions are the preferred embodiments of the present invention. Those skilled in the art should appreciate that the scope of the present invention is not limited to the described preferred embodiments. The scope of the present invention is expressly not limited expect as specified in the accompanying claims. Various changes and modifications can be made within the spirit and scope of the present invention, as defined by the following Claims.

What is claimed is:

1. A method for multi-core instruction-set simulation, comprising:

converting a binary program of a target frame into an intermediate code;

analyzing a control flow instruction of said intermediate code to establish a control flow graph of said binary program;

estimating execution time of each basic block in said control flow graph;

estimating relative time of each read or write memory instruction;

for each basic block, identifying each said read or write memory instruction that is the earliest possible instruction to be met after finishing execution of each said basic block as a sync point;

for each sync point, removing said sync point if a register for pointing address of each said read or write memory instructions is a stack pointer register or a frame pointer register, inserting a first sync handler if the sync point is a write instruction or inserting a second sync handler if the sync point is a read memory instruction;

and using said intermediate code, said read or write memory instruction which is the earliest possible instruction to be met after finishing execution of each said basic block, said sync point, and said sync handler to generate native codes for simulating said binary program.

2. The method for multi-core instruction-set simulation according to claim 1, further comprising: executing simulation process by utilizing said native codes, wherein an instruction-set simulator stops to execute said sync handler while said instruction-set simulator reaches to one of said sync point; checking address of said read or write memory by said instruction-set simulator in said sync handler, wherein if said address is not within the scope of a shared memory segment, said instruction-set simulator will stop the sync handler and subsequently perform said simulation process, and if said address is within the scope of said shared memory segment, said instruction-set simulator will execute synchronization process with other instruction-set simulators; and said instruction-set simulator will subsequently execute said simulation process after synchronizing with said other instruction-set simulators.

3. The method for multi-core instruction-set simulation according to claim 1, wherein said target frame is a multi-core frame with shared memories.

4. The method for multi-core instruction-set simulation according to claim 1, wherein said control flow instruction comprises branch, jump, call, or return instructions.

5. The method for multi-core instruction-set simulation according to claim 1, wherein said relative time is measured from the start of said basic block.

6. The method for multi-core instruction-set simulation according to claim 2, wherein synchronizing said instruction-set simulator with said others further comprising: if said sync point is Read, it waits until that the next sync point possibly Write of other instruction-set simulators is later than said target time of said instruction-set simulator to maintain the dependency relationship of Read After Write (RAW); and if said sync point is Write, it waits until that the next sync point possibly Read and Write of other instruction-set simulators is later than said target time of said instruction-set simulator for the purpose of maintaining the dependency relationship of Write After Write (WAW) and Write After Read (WAR).

7. The method for multi-core instruction-set simulation according to claim 1, wherein steps of pre-determining each said read or write memory instruction as said sync point and said sync point been removable can be executed before step of estimating execution time of each said basic block in said control flow graph.

8. A device for multi-core instruction-set simulation, comprising:

A processor and a memory coupled to the processor storing a static module and a dynamic module:

said static module comprising:

a first transcoding module, for converting a binary program of a client frame into an intermediate code;

a control flow graph module coupled to said first transcoding module, for analyzing a control flow instruction and establishing a control flow graph of said binary program;

a timing estimation module coupled to said control flow graph module, for estimating an execution time of each basic blocks in said control flow graph, estimating relative time of each read or write memory instruction, and finding out said read or write memory instruction which is the earliest possible instruction to be met after finishing execution of said basic block;

a sync point module coupled to said first transcoding module, for setting each said read or write memory instructions to be a sync point;

a sync handler module coupled to said first transcoding module, said control flow graph module, said timing estimation module, and said sync point module, inserting a first sync handler if the sync point is a write instruction or inserting a second sync handler if the sync point is a read memory instruction;

and a second transcoding module coupled to said sync handler module, for generating native codes corresponding to simulated binary program by said intermediate code, said read or write memory instruction which is the earliest possible instruction to be met after finishing execution of said basic block, said sync point, and said sync handler said dynamic module comprising:

a simulation module coupled to said second transcoding module in said static module, for performing a simulation process by executing said native codes, wherein when an instruction-set simulator reaches to one of said sync point, the instruction-set simulator stops to execute a sync handler;

a decision module coupled to said simulation module, for checking address of said read or write memory of said instruction-set simulator which has entered the sync handler, wherein if said address is not within scope of a shared memory segment, said instruction-set simulator will stop said sync handler and subsequently perform said simulation process, wherein for each sync point, said sync point is removed if a register for pointing address of the corresponding read or write memory instructions is a stack pointer register or a frame pointer register; and a synchronization module coupled to said decision module and said simulation module for synchronization.

9. The device for multi-core instruction-set simulation according to claim 8, wherein if said decision module decides that said address of said read or write memory instruction of said instruction-set simulator is within said scope of said shared memory segment, said instruction-set simulator will synchronize with other instruction-set simulators and said instruction-set simulator will subsequently execute said simulation process after completing synchronization.

10. The device for multi-core instruction-set simulation according to claim 8, wherein said target frame is a multi-core frame with shared memories.

11. The device for multi-core instruction-set simulation according to claim 8, wherein said control flow instruction comprises branch, jump, call, or return instructions.

12. The device for multi-core instruction-set simulation according to claim 8, wherein said relative time is measured from the start of said basic block.

13. The device for multi-core instruction-set simulation according to claim 9, wherein synchronizing said instruction-set simulator with others further comprising: if said sync point is Read, it waits until that the next sync point possibly read of other instruction-set simulators is later than said target time of said instruction-set simulator to maintain the dependency relationship of Read After Write (RAW); and if said sync point is Write, it waits until that the next sync point possibly read and write of other instruction-set simulators is later than the target time of said instruction-set simulator for purpose of maintaining dependency relationship of Write After Write (WAW) and Write After Read (WAR).

* * * * *